Dec. 4, 1956  D. C. HANKIN  2,772,759
PROPULSION CONTROL SYSTEM
Filed March 21, 1952  2 Sheets-Sheet 1
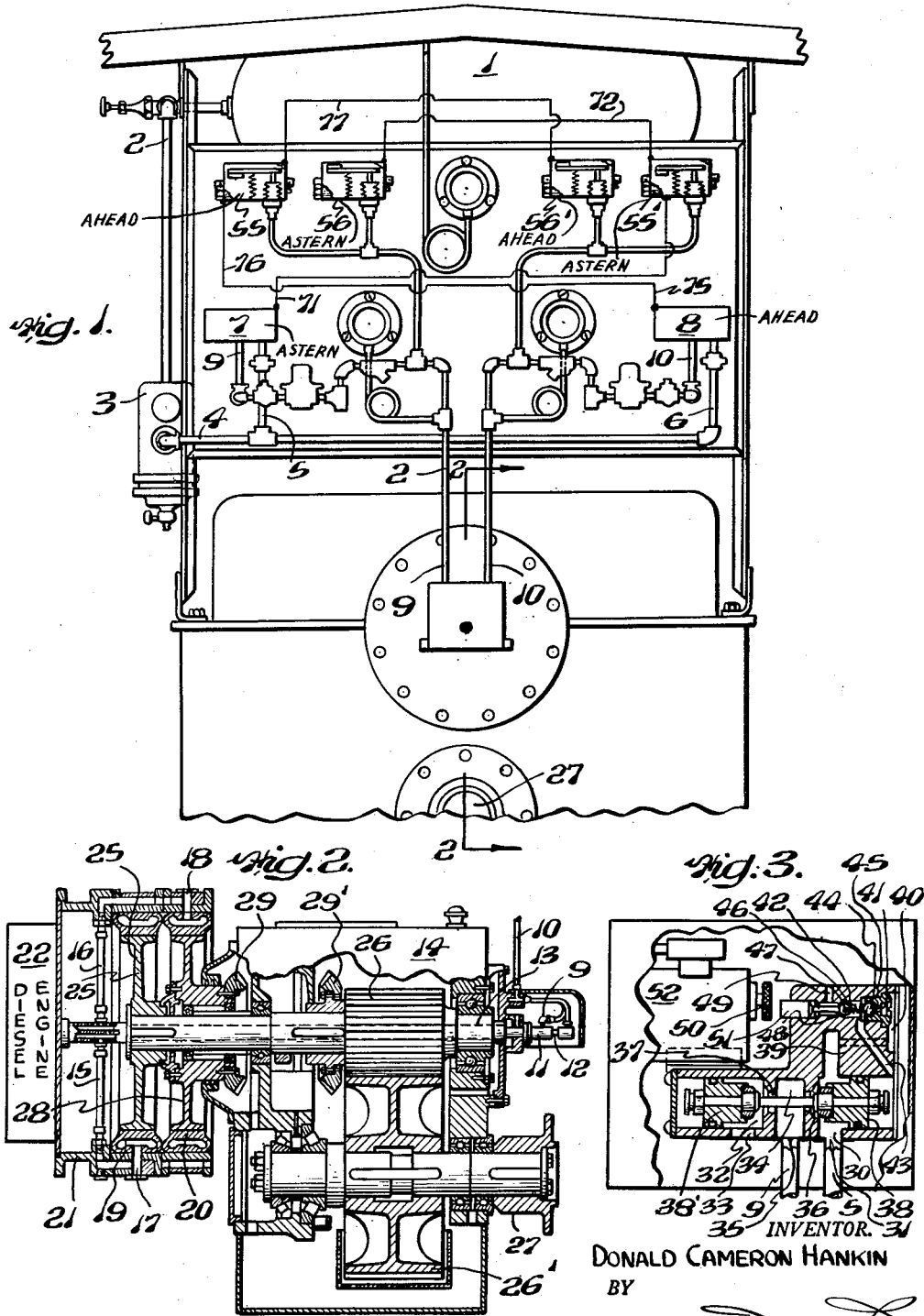
INVENTOR.
DONALD CAMERON HANKIN
BY
HIS ATTORNEY

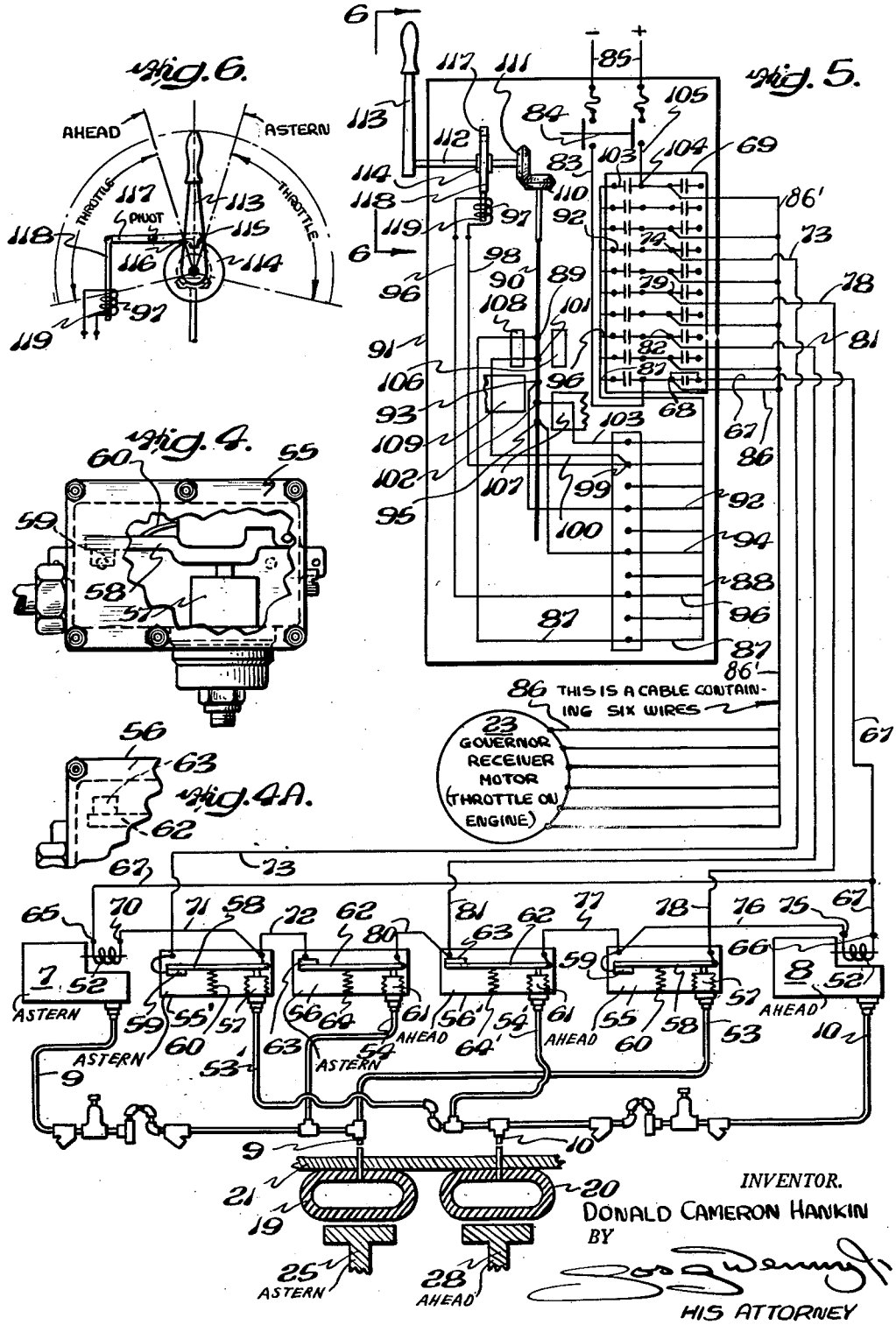

United States Patent Office 2,772,759
Patented Dec. 4, 1956

2,772,759

PROPULSION CONTROL SYSTEM

Donald Cameron Hankin, Rancocas, N. J., assignor to RTC Shipbuilding Corporation, Camden, N. J., a corporation of New Jersey Application March 21, 1952, Serial No. 277,865

8 Claims. (Cl. 192—.098)

My invention is an improved apparatus for coupling a driving member with either of two driven members through clutches each of which is operable instantaneously upon the release of the other clutch but which are inoperable to effect concurrent coupling of the driving member to both driven members under any conditions.

My invention is particularly applicable to the coupling of a unidirectional rotating member in alternation with either of two oppositely rotatable members to control the propulsion of a vessel or other vehicle to permit the rapid reversal of the direction of movement without imposing excessive stresses upon the source of power or the propulsive mechanism.

My improvements are preferably embodied in propulsive apparatus including an irreversible prime mover, such as an internal combustion engine or turbine, for unidirectionally rotating a drum or rotor which is connectable through fluid pressure operable clutches with the peripheries of wheels connected respectively, with "ahead" and "astern" gearing connected with the propeller shaft.

In accordance with my invention, the fluid pressure for actuating the "ahead" or forward clutch is controlled by fluid pressure applied to the "astern" or reverse clutch so as to prevent the application of actuating pressure to the "ahead" clutch while actuating pressure is applied to the "astern" clutch.

Similarly, the fluid pressure actuating the "astern" clutch is controlled by fluid pressure applied to the "ahead" clutch so as to prevent the application of actuating pressure to the "astern" clutch while actuating pressure is applied to the "ahead" clutch. The actuating pressure applied to either clutch controls a throttle lock which keeps the prime mover at idling speed until one of the clutches is in operating position and prevents shifting from "ahead" to "astern" positions, or vice versa, without reducing the prime mover to idling speed.

The characteristics of my invention, and the best method in which I have contemplated applying the principles thereof, will more fully appear from the following description and the accompanying drawings in illustration thereof.

In the drawings, Fig. 1 is a somewhat diagrammatic elevation showing the assembly of certain elements included in my improved control system on, or adjacent to, the bulkhead of a vessel and the gear box and propeller shaft thereof; Fig. 2 is a vertical, longitudinal sectional view taken through the clutch mechanism and gear box approximately on the line 2—2 of Fig. 1; Fig. 3 is a longitudinal sectional view of a type of electromagnetic fluid pressure control which may be used in a control system embodying my invention; Fig. 4 is a part sectional elevation of an electric switch operable to interrupt a circuit to an electromagnet of Fig. 3 by fluid pressure sufficient to operate a clutch; Fig. 4A is a fragmentary view showing a modification of the switch of Fig. 4 to render it operable to close a circuit by fluid pressure sufficient to actuate a clutch; Fig. 5 is a diagrammatic layout illustrating a control system embodying my invention; and Fig. 6 is a fragmentary, somewhat diagrammatic side elevation taken on the line 6—6 of Fig. 5.

In the drawings, I have illustrated an embodiment of my invention in a ship propulsion apparatus wherein compressed air is maintained at a suitable pressure in a tank (Fig. 1) by a compressor (not shown). The tank 1 communicates through a valved tube 2, air filter 3, manifold 4, and branches 5 and 6 with electromagnetically operable valve mechanisms 7 and 8 (Fig. 3), hereinafter more fully described.

The respective valve mechanisms 7 and 8 are operable to establish communication between the branches 5 and 6 and the tubes 9 and 10, respectively or to vent the latter to atmosphere.

The tubes 9 and 10 may include strainers, controlled inflation valves, or other auxiliary fittings and respectively communicate (Fig. 2), through suitable air seals, with passages 11 and 12 extending axially through the pinion shaft 13 of a known type of Falk speed reducing and reversing gear box 14. The respective passages 11 and 12 communicate through rotary, radial tubes 15 and 16 and passages 17 and 18 with fluid pressure operable clutches, preferably including expansible tires 19 and 20 carried by a drum or fly wheel 21 of a diesel engine 22 whose speed is controlled by a usual type of throttle and governor 23 (Fig. 5).

The tire 19 encircles and is expansible by fluid pressure against the periphery of a wheel 25 splined on the pinion shaft 13. Rotary motion imparted by the drum 21 and tire 19 to the wheel 25 is transmitted through usual reduction gears 26, 26' to a propeller shaft 27 to rotate the latter contra to the drum 21.

The tire 20 encircles and is expansible by fluid pressure against the periphery of a wheel 28 rotatably sleeved on the shaft 13. A spiral beveled gear 29 is fixed to the hub of the wheel 28 and meshes with spiral beveled pinions (not shown) journaled in the gear box. These spiral beveled pinions mesh with a spiral beveled gear 29' splined on the shaft 13, so as to rotate the pinion 26 contra to the drum 21 and thereby rotate the shaft 27 in the same direction as the drum 21 when the drum 21 and wheel 28 are coupled together by the tire 20.

Each valve mechanism 7 or 8 for controlling the admission of compressed air to a clutch tire 19 or 20 and for venting air therefrom may consist of a known form of device (Fig. 3) containing a piston chamber 30 communicating through a port 31 with a branch 5 or 6; a piston chamber 32 communicating with atmosphere through a port 33; and a chamber 34 communicating with a tube 9 or 10 through a port 35 and communicating alternately with the chambers 30 and 32 through the ports 36 and 37 controlled by valve washers on the connected reciprocable pistons 38 and 38'.

The valve washer on the piston 38 is normally seated to close the port 36 and the valve washer on the piston 38' is normally unseated to open the port 37 by the flow of compressed air from the chamber 30 through the passages 39, 40, 41, 42 and 43 to the space behind the enlarged head of the piston 38; reverse air flow being prevented by the seating of the ball valve 44 on its seat 45 and spring 46.

In this position of the parts there is no flow of air from a valve mechanism 7 or 8 to its corresponding clutch tire, and the latter is vented to atmosphere.

To supply air to a clutch tire, the valve washer on the piston 38 is unseated from the port 36 of the corresponding valve mechanism 7 or 8, and the port 37 is simultaneously closed by the seating of the valve washer of the corresponding piston 38'. This shifting of the pistons may be conveniently effected by unseating a ball check 47 from its seat 48 and venting the passage 42 to atmosphere through the vent 49. Air thus escapes from behind the piston through the passages 43, 42, and 49 so that the pressure of the compressed air in the chamber 30 on the enlarged head of the piston 38 shifts the pistons 38 and 38' rectilineally. The unseating of the ball check 48 may be effected by the thrust of a solenoid core 50 against a plunger 51 when the solenoid 52 is energized by the flow of current through the coil thereof. It will thus be seen that either tire may be inflated by closing an electric circuit through the solenoid 52 of its corresponding valve mechanism 7 or 8. The clutch tire 19 communicates through the respective branches 53 and 54 of the tube 9 with the electric switches 55 (Figs. 4 and 5) and 56 (Figs. 4A and 5). The clutch tire 20 communicated through the respective branches 53' and 54' of the tube 10 with the electric switches 55' and 56' which are the same construction, respectively, as the switches 55 and 56.

As illustrated in Fig. 4, each of the switches 55 or 55' comprises a bell or bellows 57 expansible by fluid pressure to rock a switch blade 58 away from a contact 59; and the switch blade 58 being normally biased toward the contact 59 by a spring 60. Consequently whenever there is clutch actuating pressure in the clutch tire 19 the switch 55 is open, and whenever there is clutch actuating pressure in the clutch tire 20 the switch 55' is open.

As indicated in Fig. 4A each of the switches 56 or 56' comprises a bell or bellows 61 expansible by fluid pressure to rock a switch blade 62 toward a contact 63; the switch blade 62 being normally biased away from the contact 63 by a spring 64.

The terminals 65 and 66 of the solenoids 52 of the respective valve mechanisms 7 and 8 are connected through the ground conductor 67 with the terminal 68 of a manual station selector switch 69.

The terminal 70 of the solenoid 52 of the valve control mechanism 7 is connected through conductors 71 and 72 with the blade 58 of the switch 55' and with the contact 63 of the switch 56. The contact 59 of the switch 55' is connected through a conductor 73 with the terminal 74 of the switch 69.

The terminal 75 of the solenoid 52 of the valve mechanism 8 is connected through conductors 76 and 77 with a contact 59 of the switch 55 and with the blade 62 of the switch 56'. The blade 58 of the switch 55 is connected through a conductor 78 with a terminal 79 of the switch 69.

The blade 62 of the switch 56 and the contact 63 of the switch 56' are connected by conductors 80 and 81 with the terminal 82 of the switch 69.

The terminal 68 of the switch 69 is connected through a conductor 83 with one side of a switch 84 leading to a source of direct current 85.

The terminal 68 is also connected through a conductor 86 of a multi-conductor cable 86' with a terminal of the governor receiver motor 23 controlling the engine throttle. The terminal 68 is also connected through a conductor 87 of the cable 88 with a contact 89 on the drum 90 of a controller pedestal 91.

The terminal 74 of the switch 69 is connected through a conductor 92 of the cable 88 with a contact 93 on the drum 90.

The terminal 82 of the switch 69 is connected through the conductor 96 with one terminal of a solenoid 97 whose other terminal is connected through a conductor 98, terminal 99 and conductor 100 with a contact 101 on the drum 90.

The remaining (unnumbered) terminals of the switch 69 may be connected in a conventional manner through suitable conductors of the multi-conductor cable 86' with the remaining terminals of the governor receiver motor 23 and with terminals of the controller pedestal 91.

A contact 102 on the shaft 90 is connected through a conductor 103 of the cable 88 with the terminal 104 of the switch 69, and thence through the conductor 105 with the positive side of the source of direct current 85.

The contacts on the shaft 90 are movable into engagement with the respective contacts 106, 107, 108 and 109 of the pedestal 91 by rotation of the beveled gear 110 fixed to the drum. The beveled gear 110 meshes with a beveled gear 111 fixed on a journaled shaft 112 to which the throttle handle 113 is secured. The shaft 112 has fixed thereto a disk 114 containing a peripheral notch 115 for the reception of the tongue 116 of a pivoted latch 117. A link 118 is pivotally connected with the latch 117 and is fixed to a core 119 operable by the flow of current through the solenoid 97.

*Operation*

Prior to starting the system, the station selector switch 69 is manually operated to bring a desired station into operation, e. g. the central contacts of the switch 69 are shifted toward the left when the station containing the pedestal 91 is to be put into operation.

When the switch 84 is closed and the handle 113 and shaft 112 are moved toward "ahead" position (Fig. 6) to the limit permitted by the loose interlock of the tongue 116 in the notch 115, the shaft 90 is slightly turned so that the contacts 106 and 107 respectively close the circuits between the contacts 89 and 101 and between the contacts 95 and 102 respectively.

Current then flows from the positive terminal of the switch 84 through the conductor 105, terminal 104, conductor 103, contact 102, contact 107, contact 95, conductor 94 of cable 88, terminal 79, conductor 78 to the switch blade 58 of switch 55. If the pressure in the clutch tire 19 is less than the clutch operating pressure the bell or bellows 57 will be collapsed and the blade 58 will be drawn by the spring 60 into engagement with the contact 59 of the switch 55. Current will then flow from the switch blade 58 through the contact 59 of the switch 55, through the conductor 76, terminal 75, solenoid 52 of the pressure control 8, terminal 66, conductor 67, terminal 68, ground conductor 83 to the negative side of the source of supply of D. C. current 85.

The flow of current through the coil of the solenoid 52 of the pressure control 8 causes the core 50 and plunger 51 to unseat the ball 47 and vent the passages 42 and 43, thereby shifting the pistons 38 and 39 and admitting air under pressure to the clutch tire 20. The expanding tire 20 causes it to couple together the drum 21 and wheel 28 and effect the rotation of the propeller shaft 27 in the "ahead" direction, as hereinbefore described.

If, however, there is clutch operating pressure in the clutch tire 19 when the handle 113 is moved to "ahead" position, this pressure is communicated to the bell or bellows 57 of the switch 55 to disengage the switch 58 from the contact 59, and thereby prevent the flow of current through the solenoid 52 of the pressure control 8 until the pressure in the tire 19 has dropped sufficiently to permit the closure of the switch 55.

When the flow of air through the fluid pressure control 8 has raised the pressure in the clutch tire 20 sufficiently to couple the drum 21 and wheel 28, the fluid pressure communicated through the tube 10 and branch 54' to the bell or bellows 61 of the switch 56' overcomes the spring 64 of the switch 56' and moves the blade 62 into contact with the contact 63 of the switch 56'. A circuit is thereby established from the "hot" contact 59 of the switch 55 through the conductor 77, blade 62 and contact 63 of the switch 56', conductor 81, terminal 82, conductor 96 of the cable 88, solenoid coil 97, conductor 98, terminal 99, conductor 100, contact 101, contact 89, contact 106, contact 89, ground conductor 87 of the cable 88, terminal 68, conductor 83, switch 84 to the negative side of the source of D. C. current 85.

The flow of current through the solenoid coil 97 attracts the core 119 which operates on the link 118 and rocks the latch lever 117 to lift a tongue 116 out of the notch 115. This permits the throttle handle 113 to be thrust forward and connects, in the usual manner, the requisite circuits of the switch 69 with the governor receiver motor 23 of the engine throttle to increase the speed of the engine 22 to any desired extent.

The contact 106 is narrower than the contact 107 so that continued forward movement of the throttle handle 113 interrupts the circuit through the contacts 89 and 101 to de-energize the solenoid 97 without interrupting the circuit through the contacts 95 and 102 or the maintenance of the "ahead" clutch in coupling condition.

On the movement of the throttle handle 113 from "ahead" position toward "astern" position, the tongue 116 drops into the notch 115 and thereby limits the initial "astern" movement of the handle 113 and drum 90.

The width of the notch 115 is, however, sufficient to permit the movement of the handle 113 and drum 90 to bring the contacts 89 and 101 into engagement with the contact 108 and to bring contacts 93 and 102 into engagement with the contact 109. The interlock of the tongue 116 in the notch 115, however, prevents sufficient movement of the throttle handle 113 to close the circuits of the switch 69 and speed up the engine.

The engagement of the contacts 93 and 102 with the contact 109 closes a circuit from the positive side of the switch 84 through the terminal 104, conductor 103 of the cable 88, contact 102, contact 109, contact 93, conductor 92 of the cable 88, terminal 74, conductor 73 to the contact 59 of the switch 55′. As soon as sufficient air has been vented to atmosphere from the tire 20 through the pressure control 8, the pressure in the bell or bellows 57 of the switch 55′ falls sufficiently to permit the spring 60 thereof to draw the blade 58 thereof into engagement with the contact 59 thereof. This completes a circuit from the "hot" contact 59 through the blade 58 of the switch 55′, through the conductor 71, terminal 70, solenoid coil 52 of the pressure control 7, terminal 65, conductor 67, terminal 68 and conductor 83 to the negative side of the switch 84.

The flow of current through the solenoid 52 of the pressure control 7 causes the core 50 and plunger 51 to unseat the ball 48 and, through the operations previously described, open communication between the branch 5 and the tube 9.

When the air pressure in the tire 19 is raised sufficiently to clutch the drum 21 and wheel 25 firmly together, the corresponding fluid pressure in the bell or bellows 61 of the switch 56 operates the latter to move the blade 62 into engagement with the contact 63 of the switch 56. A circuit is thereby closed from the "hot" contact 63 and switch blade 62 of the switch 56, through the conductors 80, 81, terminal 82, conductor 96 of the cable 88 to the coil of the solenoid 97, thence through the conductor 98, terminal 99, conductor 100, contact 101, contact 108, contact 89, conductor 87 of the cable 88, conductor 83 to the negative side of switch 84.

The current flowing through coil 97 attracts the core 119 and causes the link 118 to rock the latching lever 117 to lift the tongue 116 from the notch 115 and thereby permit the further "astern" movement of the throttle handle 113. Such further movement of the throttle handle affects the rotation of the drum 90 to close appropriate circuits, in the usual manner, through the switch 69 and the governor receiver motor 23 controlling the throttle on the engine 22, thereby speeding up the engine 22 to any desired degree.

The contact 108 is of less width than the contact 109 so that the circuit to the solenoid coil 97 may be interrupted by the "astern" movement of the throttle handle 113 without interrupting the circuit through the solenoid coil 52 of the fluid control 7.

It will thus be apparent that the throttle handle 113 can be moved to either "ahead" or "astern" positions, or instantaneously from one of such positions to the other, while the engine is idling, but that the clutch tire 20 cannot be inflated while there is clutch actuating pressure in the tire 19 for opening the switch 55, and, conversely, the clutch tire 19 cannot be inflated while there is clutch actuating pressure in the tire 20 to open the switch 55′. Moreover, the engine cannot be speeded up until one or the other of the tires 19 or 20 is inflated by clutch actuating pressure.

When rapid reversal of the direction of propulsion is required, the shifting of the throttle handle in the desired direction will cause the corresponding clutch to be actuated as soon as the pressure on the other clutch drops below actuating pressure, and without awaiting the complete venting of the other tire. This results in a marked speeding up of the operating characteristics of the control system without any danger of concurrent coupling of the wheels 25 and 28 to the drum 21.

Having described my invention, I claim:

1. In apparatus of the character described, the combination with an internal combustion engine, a driving member operable by said engine, a pair of driven members, and throttle mechanism controlling the supply of fuel to said engine, of fluid operable clutching mechanisms for connecting said driving member with the respective driven members, valve mechanism controlling the fluid pressure actuating one of said clutching mechanisms, means responsive to the fluid pressure actuating the other of said clutching mechanisms for controlling said valve mechanism, a second valve mechanism controlling the fluid pressure actuating said last named clutching mechanism, means responsive to the fluid pressure actuating the said first named clutching mechanism for controlling said second named valve mechanism, and latching means including mechanism responsive to fluid pressure actuating either of said clutching mechanisms for limiting the movement of said throttle mechanism.

2. In apparatus of the character described, the combination with a driving member and a pair of driven members, of fluid operable clutching mechanisms for connecting said driving member with the respective driven members, electro-magnetic valve mechanism controlling the fluid pressure actuating one of said clutching mechanisms, and an electric switch in circuit with said electro-magnetic valve mechanism and responsive to fluid pressure actuating the other of said clutching mechanisms for controlling said valve mechanism.

3. In apparatus of the character described, the combination with a driving member and a pair of driven members, of fluid operable clutching mechanisms for connecting said driving member with the respective driven members, electro-magnetic valve mechanism controlling the fluid pressure actuating one of said clutching mechanisms, an electric switch in circuit with said electro-magnetic valve mechanism and responsive to fluid pressure actuating the other of said clutching mechanisms, a second electro-magnetic valve mechanism controlling the fluid pressure actuating said last named clutching mechanism, and an electric switch in circuit with said second named electro-magnetic valve mechanism and responsive to the fluid pressure actuating said first named clutching mechanism for controlling said last named electro-magnetic valve mechanism.

4. In apparatus of the character described, the combination with an internal combustion engine, a driving member operable by said engine, a pair of driven members operable by said driven member, and throttle mechanism controlling the supply of fuel to said engine, of fluid operable clutch mechanisms for connecting said driving member with the respective driven members, electro-magnetic valve mechanism controlling the fluid pressure actuating one of said clutch mechanisms, an electric switch in circuit with said electro-magnetic valve mechanism and responsive to the fluid pressure actuating the other of said clutch mechanisms for controlling said valve mechanism, electro-magnetic latching mechanism controlling said throttle mechanism, and an electric switch in circuit with said first named electric switch and responsive to fluid pressure actuating said first named clutch mechanism for controlling the said electro-magnetic latching mechanism.

5. In apparatus of the character described, the combination with an internal combustion engine, a driving member operable by said engine, a pair of driven members operable by said driving member, and throttle mechanism controlling the supply of fuel to said engine, of fluid operable clutching mechanisms for connecting said driving member with the respective driven members, electro-magnetic valve mechanism controlling the fluid pressure actuating one of said clutching mechanisms, an electric switch in circuit with said electro-magnetic valve mechanism and responsive to the fluid pressure actuating the other of said clutching mechanisms for controlling said electro-magnetic valve mechanism, a second electro-magnetic valve mechanism controlling the fluid pressure actuating said last named clutching mechanism, an electric switch in circuit with said last named electro-magnetic valve mechanism and responsive to the fluid pressure actuating said first named clutching mechanism for controlling said second named electro-magnetic valve mechanism, electro-magnetic latching mechanism controlling said throttle mechanism, and electric switch mechanisms in circuit with said electro-magnetic latching mechanism and responsive respectively to the fluid pressures actuating the respective clutching mechanisms.

6. In apparatus of the character described, the combination of a driving member and a pair of driven members, of fluid operable clutching mechanisms for connecting said driving member with the respective driven members, valve mechanism including a solenoid controlling the fluid pressure actuating one of said clutching mechanisms, and an electric switch in circuit with said solenoid and including an expansible device operable by fluid pressure actuating the other of said clutching mechanisms to open the circuit of said solenoid.

7. In apparatus of the character described, the combination with an internal combustion engine, a driving member operable by said engine, a pair of driven members operable by said driving member, and throttle mechanism controlling the flow of fuel to said engine, of fluid operable clutching mechanisms for connecting said driving member with the respective driven members, valve mechanism including a solenoid controlling the fluid pressure actuating one of said clutching mechanisms, an electric switch in circuit with said solenoid and including a device expansible by the fluid pressure actuating one of said clutching mechanisms, latching mechanism including a solenoid limiting the movement of said throttle mechanism, and an electric switch in circuit with said second named solenoid and including a device expansible by the fluid pressure actuating the other of said clutching mechanisms to close the circuit of said second solenoid.

8. In apparatus of the character described, the combination with an internal combustion engine, a driving member operable by said engine, a pair of driven members operable by said driving member, and throttle mechanism controlling the flow of fuel to said engine, of fluid operable clutching mechanisms for connecting said driving member with the respective driven members, valve mechanism including a solenoid controlling the fluid pressure actuating one of said clutching mechanisms, an electric switch in circuit with said solenoid and including a device expansible by the fluid pressure actuating one of said clutching mechanisms, latching mechanism including a solenoid limiting the movement of said throttle mechanism, an electric switch in circuit with said second named solenoid and including a device expansible by the fluid pressure actuating the other of said clutching mechanisms to close the circuit of said second solenoid, and means for interrupting the circuit of the second solenoid independently of either of said switches.

References Cited in the file of this patent

UNITED STATES PATENTS

| | | |
|---|---|---|
| 2,065,820 | Mellon | Dec. 29, 1936 |
| 2,286,873 | Schwartz | June 16, 1942 |
| 2,304,030 | Schmitter | Dec. 1, 1942 |
| 2,304,031 | Schmitter | Dec. 1, 1942 |
| 2,304,032 | Schmitter | Dec. 1, 1942 |
| 2,396,231 | Brill | Mar. 12, 1946 |
| 2,403,647 | Fike et al. | July 9, 1946 |
| 2,464,986 | Miller | Mar. 22, 1949 |
| 2,560,990 | Schmitter | July 17, 1951 |